UNITED STATES PATENT OFFICE.

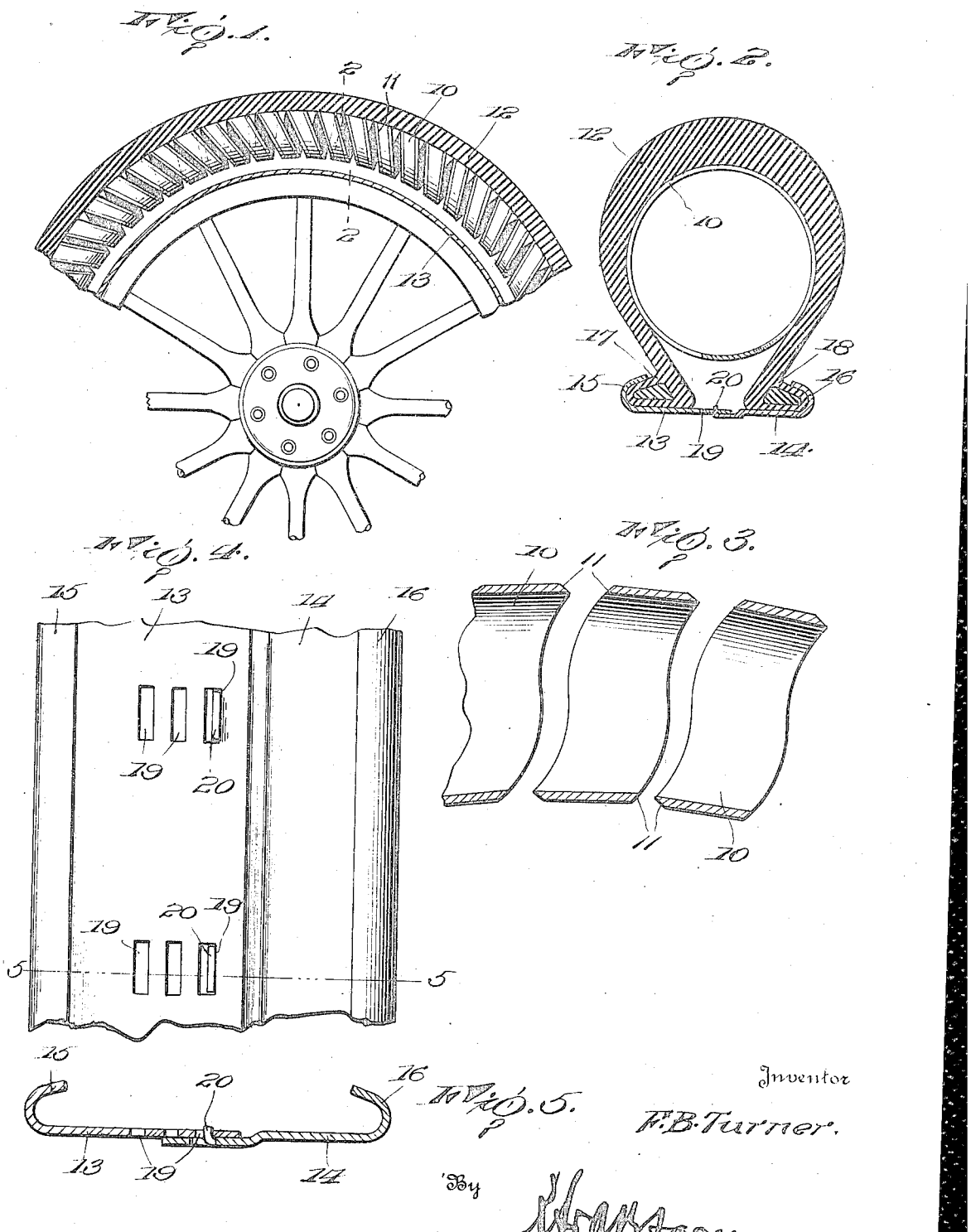

FRANK B. TURNER, OF OCALA, FLORIDA, ASSIGNOR OF ONE-HALF TO LOUIS W. DUVAL, OF OCALA, FLORIDA.

RESILIENT WHEEL-TIRE AND ADJUSTABLE RIM.

1,307,164.   Specification of Letters Patent.   Patented June 17, 1919.

Application filed December 10, 1917. Serial No. 206,494.

*To all whom it may concern:*

Be it known that I, FRANK B. TURNER, a citizen of the United States, residing at Ocala, in the county of Marion and State of Florida, have invented certain new and useful Improvements in Resilient Wheel-Tires and Adjustable Rims, of which the following is a specification.

This invention relates to tires for automobile and other vehicles and has for its object to provide a comparatively simple and inexpensive device of this character including means whereby the wheel rim may be adjusted to apply lateral pressure on the tire casing and the resilient element therein.

The invention consists in certain novel features of construction, as hereinafter shown and described and then specifically pointed out in the claim; and in the drawings illustrative of the preferred embodiment of the invention—

Figure 1 is a side elevation of a portion of an automobile wheel with the improvement applied, the tire casing and the adjustable rim being in longitudinal section.

Fig. 2 is an enlarged sectional view on the line 2—2 of Fig. 1.

Fig. 3 is an enlarged sectional detail of the resilient filler member of the tire casing.

Fig. 4 is an enlarged plan view of a portion of the adjustable rim.

Fig. 5 is a section on the line 5—5 of Fig. 4.

The improved device is designed to replace the ordinary expansible inner tube of an automobile wheel, and occupies the space of the inner tube. The improved attachment may be of any required size to adapt it to tire casings of various sizes, and is formed initially of a single strip of material represented as a whole at 10 having the edges chamfered or beveled as indicated at 11 in Fig. 3, and then wound in spiral form with the beveled edges in relatively close relation as illustrated in Fig. 1. The ribbon of sheet metal is curved to conform to the curvature of the casing, represented as a whole at 12, and disposed therein before the casing is connected to the rim. At its terminal the ribbon of metal after being coiled is rigidly united, preferably by electric welding, so that the coiled member is practically continuous or endless.

The wheel rim is formed of coacting annular portions 13—14 having clencher flanges 15—16 to receive the bead portions 17—18 of the casing 12. At their inner edges the rim sections 13—14 overlap, and one of the sections, for instance the section 13, is provided with a plurality of slots 19, while the other section 14 is provided with a plurality of lips 20 adapted to engage in the slots and thus couple the sections 13—14 together. The slots 19 are arranged in groups transversely of the rim sections, so that the tongues or projections 20 may be inserted in the slots to enable the rim sections to be adjusted laterally of the tire and thus tighten the tire casing upon the spiral core member, as will be obvious. By this means the rim may be readily adjusted to correspond to the size of the tire, and apply the requisite pressure against the spiral core, and hold it firmly in position.

By forming the metal ribbon with its edges chamfered or beveled no sharp edges are projected against the inner wall of the casing, hence the wear and friction upon the casing is rendered negligible. The material of the casing is thus protected from injury from the metal strip.

Having thus described the invention, what is claimed as new is:

The combination with a tire casing, of a resilient core disposed within the casing and means for compressing the walls of the tire casing against the core, said means comprising a rim including coacting annular sections having their inner edges overlapped, one of the rim sections being provided with a plurality of transverse rows of spaced apertures and the other with tongues adapted to enter the apertures.

In testimony whereof I affix my signature.

FRANK B. TURNER. [L. S.]